(12) United States Patent  
Daghigh (10) Patent No.: US 9,383,848 B2  
(45) Date of Patent: Jul. 5, 2016

(54) INTERLEAVED PIEZOELECTRIC TACTILE INTERFACE

(71) Applicant: Intermec Technologies Corporation, Everett, WA (US)

(72) Inventor: Hamoon Ghasemzadeh Daghigh, Seattle, WA (US)

(73) Assignee: Intermec Technologies Corporation, Everett, WA (US)

( * ) Notice: Subject to any disclaimer, the term of this patent is extended or adjusted under 35 U.S.C. 154(b) by 0 days.

(21) Appl. No.: 13/715,336

(22) Filed: Dec. 14, 2012

(65) Prior Publication Data

US 2013/0257759 A1 Oct. 3, 2013

Related U.S. Application Data

(63) Continuation-in-part of application No. 13/433,994, filed on Mar. 29, 2012.

(51) Int. Cl.  
*G06F 3/041* (2006.01)

(52) U.S. Cl.  
CPC ............ *G06F 3/0412* (2013.01); *G06F 3/0414* (2013.01)

(58) Field of Classification Search  
CPC ...... G06F 3/041; G06F 3/0414; G06F 3/0412  
USPC ......................................................... 345/173  
See application file for complete search history.

(56) References Cited

U.S. PATENT DOCUMENTS

| 4,516,112 | A |   | 5/1985  | Chen |
|-----------|---|---|---------|------|
| 4,934,197 | A | * | 6/1990  | Nitsche ..................... 73/862.041 |
| 5,760,346 | A | * | 6/1998  | Kobayashi et al. ........ 178/18.04 |
| 5,824,904 | A | * | 10/1998 | Kouhei et al. ............. 73/514.34 |
| 7,183,948 | B2 |   | 2/2007 | Roberts |
| 2005/0134574 | A1 | * | 6/2005 | Hill ............................... 345/173 |
| 2010/0128002 | A1 | * | 5/2010 | Stacy et al. .................... 345/174 |
| 2011/0002485 | A1 | * | 1/2011 | Onishi et al. .................. 381/190 |

(Continued)

FOREIGN PATENT DOCUMENTS

CN 102347630 * 2/2012

OTHER PUBLICATIONS

O'Connor, Microchip Technology Inc. paper No. TB3064 "mTouch Projected Capacitive Touch Screen Sensing Theory of Operation" (2010) pp. 1-16.

(Continued)

*Primary Examiner* — Sahlu Okebato  
(74) *Attorney, Agent, or Firm* — Additon, Higgins & Pendleton, P.A.

(57) ABSTRACT

A piezoelectric tactile input device and method in a computing environment. An embodiment disclosed herein includes a touch screen having several piezoelectric regions within a piezoelectric material layer that may generate a voltage when deformed in a localized area. The piezoelectric layer may be disposed between sensor layers of rows and columns of sensor traces for detecting the voltage generated at any particular piezoelectric region. The detected voltage signals may then be used to extrapolate the position of the localized area in which the piezoelectric layer was deformed (e.g., from a finger touch or a stylus). Further, because the piezoelectric layer generates a greater voltage in the presence of a greater pressure, the device may further decipher a relative level of force for the tactile input on the touch screen and detect multiple touch locations.

20 Claims, 5 Drawing Sheets

(56) References Cited

U.S. PATENT DOCUMENTS

| | | | |
|---|---|---|---|
| 2012/0194483 A1* | 8/2012 | Deluca | 345/177 |
| 2012/0212434 A1* | 8/2012 | Bluemler et al. | 345/173 |
| 2012/0274577 A1* | 11/2012 | Paleczny | 345/173 |
| 2013/0002602 A1* | 1/2013 | Apelbaum et al. | 345/174 |
| 2013/0257744 A1 | 10/2013 | Daghigh et al. | |

OTHER PUBLICATIONS

Telecompaper, "Fujitsu develops touch panel screen with light transparency of 98%," downloaded from http://www.telecompaper.com/news/fujitsu-develops-touch-panel-screen-with-light-transparency-of-98 on Mar. 6, 2014, pp. 1-3.

Measurement Specialites, Inc. Norristown, PA "Piezo Film Sensors Technical Manual", P/N 1005663-1 Rev B Apr. 2, 1999 pp. 1-89.

Mirbagheri, "Design, Fabrication, and Testing of a Membrane Piezoelectric Tactile Sensor with Four Sensing Elements", American Journal of Applied Sciences 4(9): 645-652, 2007.

Mirgbagheri, "Finite Element Analysis of a Membrane-Type Piezoelectric Tactile Sensor with four Sensing Elements", Mechanical and Industrial Engineering Department, Concordia University, Montreal, QC, Canda: IEEE (2005): pp. 353-356.

* cited by examiner

INTERLEAVED PIEZOELECTRIC TACTILE INTERFACE

PRIORITY CLAIM AND REFERENCE TO RELATED APPLICATION

This application is a Continuation-In-Part application from U.S. patent application Ser. No. 13/433,944 entitled PIEZOELECTRIC TACTILE INTERFACE and filed on Mar. 29, 2012 and is hereby incorporated by reference in its entirety.

BACKGROUND

A tactile input interface is commonly known in the industry as a touch screen. Touch screens are growing in popularity and usage as a means for navigating and using a smart device, such as a personal computer, personal data assistant, or mobile phone. Thus, a user may input commands to devices via a tactile input, which may be a user's finger or a stylus configured to interact with a tactile input interface, e.g., a touch screen. Therefore, touch screens are often sensitive to small changes in input as a user moves a finger or a stylus, yet remain rugged enough for repeated use in varying conditions as well as for transport and shipping in lower pressure and colder conditions than what a device including the touch screen may typically experience after being deployed for use. For example, touch screen devices may be shipped in a cargo hold of an airplane that experiences both lower pressures and lower temperatures at higher altitude.

Although conventional touch screens may include requisite sensitivity for typical use, they often do not have a design that may be suited to withstand lower pressure environments or colder environments that may exist during transportation and shipping. Thus, conventional touch screens are subject to failure during these shipping conditions.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be a system and method for a tactile input interface (hereinafter, referred to as a touch screen) that may detect input by using a later of piezoelectric material. An embodiment disclosed herein includes a touch screen of a computing device having a piezoelectric material layer therein. The piezoelectric layer may generate a voltage when deformed in a localized area. The piezoelectric layer may also include a pattern of sensors for detecting the voltage generated. The detected voltage signals may then be used to extrapolate the position of the localized area in which the piezoelectric layer was deformed (e.g., from a finger touch or a stylus). Further, because the piezoelectric layer generates a greater voltage in the presence of a greater pressure, the device may further decipher a relative level of force for the tactile input on the touch screen. These and other aspects of the subject matter are discussed in greater detail below with respect to FIGS. 1-6.

Figure 1:
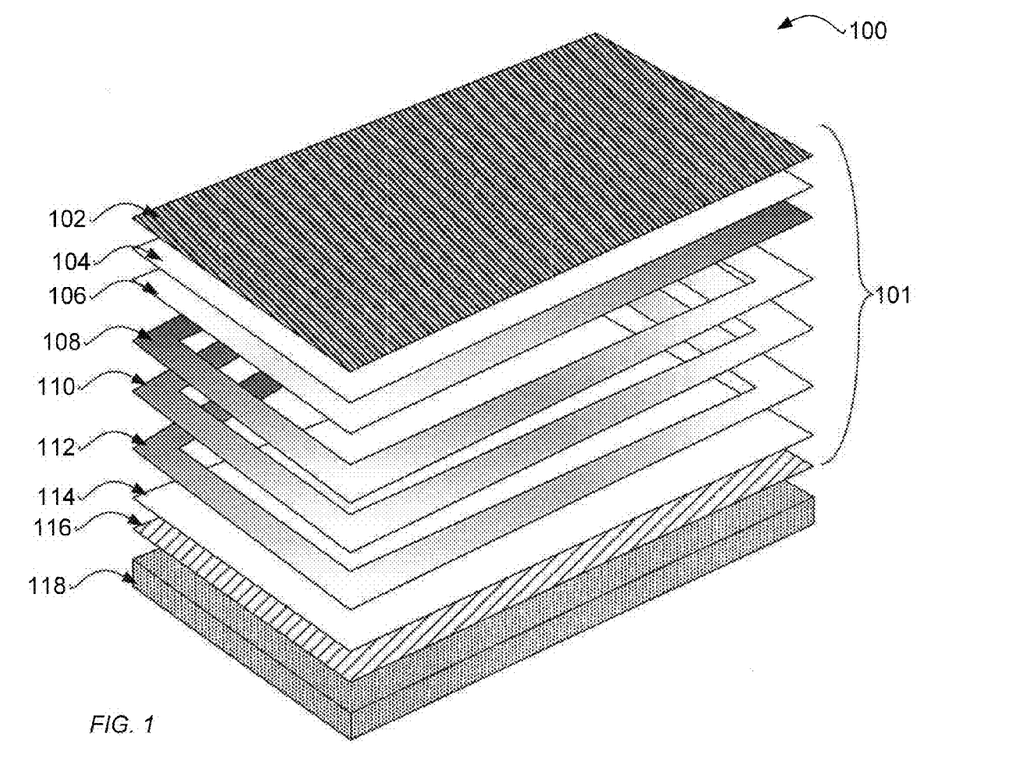
FIG. 1 is an exploded view of several layers of a touch screen having two polyethylene terephthalate (PET) layers surrounding an indium-tin oxide (ITO) layer.

FIG. 1 is an exploded view of several layers of a touch screen system 100 having a polyethylene terephthalate (PET) layer 102 covering first and second indium tin oxide coated layers 114 and 104. Such a touch screen system 100 may be suited to overlay a view screen of a computing device such that tactile input on the touch screen may control the computing device. Thus, a user who touches an area near a hyperlink may activate the hyperlink (just as a mouse click may initiate such a hyperlink actuation). Further, a user may slide a stylus or a finger along a path on the touch screen such that additional input commands are recognized, such as screen scrolling or drag-and-drop functionality. For the remainder of this disclosure, however, the specifics of touch screen input commands are not discussed in any greater detail as the focus of the discussion will remain on the touch screen itself and the manner in which tactile input is recognized and processed.

In the diagram of FIG. 1, a touch screen system 100 includes a touch screen 101 overlaying a display assembly 118 of an associated device (wherein details of the device, other than the display assembly 118, are not shown for simplistic illustrative purposes). The display assembly may be a Liquid Crystal Display (LCD), a plasma display, or any other kind of suitable display suited to be used in a computing environment. The touch screen 101 may be a resistive dual-ITO-layer touch screen. Such a touch screen 101 includes several layers for providing an interface for a user to control the associated device. These layers include a glass-backer layer 116, a first ITO coated layer 114, an x-axis directional bus bar 112, an adhesive paste layer 110, an adhesive spacer layer 108, a y-axis directional bus bar 106, a second ITO coated layer 104, and a PET layer 102. These layers are discussed in greater detail below along with a brief discussion about the operation of a resistive dual-ITO layer touch screen 101.

One concept underlying a restive touch screen 101 is that each layer is flexible. Thus, when a localized pressure is applied to an outer layer (such as by a user's finger or a stylus), each of the layers flexes slightly at the point of contact. By mounting first and second ITO coated layers 114 and 104 close together with a small air gap in between (on the order of microns), the first and second ITO coated layers 114 and 104 may contact each other when pressure is applied, thereby creating a conduction point for electrical signals. The electrical conduction at the point of contact may be sensed in a first directional coordinate (e.g., an x-axis direction), by the x-axis directional bus bar 112.

Similarly, an orthogonal directional coordinate may also be sensed by the y-axis directional bus bar 106. Together the x and y coordinates may be determined by these bus bars 112 and 106 such that associated circuitry may interpret the tactile input on the touch screen accordingly. The two ITO coated layers 114 and 104 are further spaced apart by not only the bus bars 112 and 106, but also by an adhesive paste layer 110 and an adhesive spacer layer 108. These adhesive layers provide requisite space between the ITO coated layers 114 and 104 and the bus bars 112 and 106. A glass backer 116 provides a bottom layer for the touch screen 101 suited to overlay the display assembly 118, and a PET layer 102 provides a top layer suited for external environment conditions.

There may be drawbacks to this resistive dual-ITO layer touch screen 101. Such a resistive touch screen 101 does not have any reliable vent to properly facilitate air circulation underneath the PET layer 102 due to the requirements for disposing the dual-ITO coated layers 114 and 104 close to each other. A typical modulus of elasticity (Young's Modulus—a known manner of mathematically expressing a substance's tendency to deform wherein the smaller the modulus, the more flexible a material is) for the PET layer 102 is 3 GPa. A typical modulus of elasticity for the ITO coated layers 114 and 104 is 116 GPa. Thus, the PET layer 102 is more elastic than the ITO coated layers 114 and 104 by about forty times. This is a convenient ratio for operating conditions at most temperatures and ambient pressures. However, during shipment when using air cargo transportation, an air cargo hold may experience ambient air pressure as low as 0.5 ATM and temperatures near or below freezing. This may lead to a pillowing effect (development of air pockets where the layers begin to separate) on the PET layer 102 during air shipment. Empirical and analytical data suggest that the PET layer 102 may be strained due to the different pressure and temperature conditions while the ITO layers coated 114 and 104 (with higher modulus of elasticity) remain inelastic. As a result, the ITO coated layers 114 and 104 may break and be compromised, as the PET layer 102 layer stretches while the underlying ITO coated layers 114 and 104 do not. Although, this may be addressed by having a thicker PET layer 102, such a thickness then leads to a larger activation force which in turn decreases the sensitivity of the touch panel to light touches. Further yet, general wear and tear on the touch screen 101 may also cause the various layers to fail because the small air gap between the ITO layers creates a greater probability of failure. Thus, instead of using a dual ITO layered touch screen 101 as discussed with respect to FIG. 1, a piezoelectric layer may be used in place of the dual ITO layers as is discussed further in FIGS. 2-5.

Figure 2:
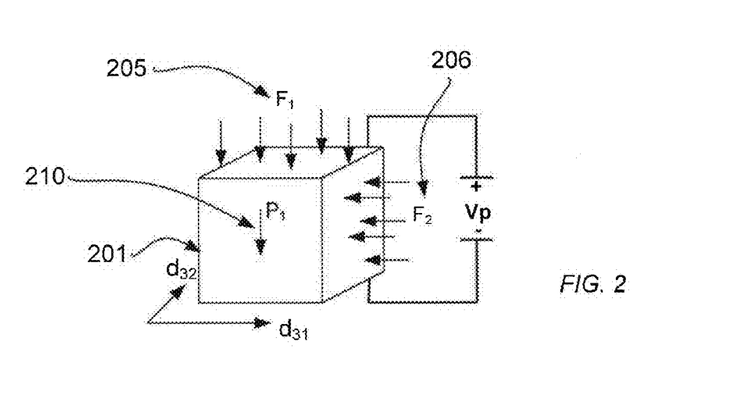
FIG. 2 is a diagram of piezoelectric material showing an electric voltage that may be generated when the piezoelectric material is displaced according to an embodiment of the subject matter disclosed herein.

FIG. 2 is a diagram of piezoelectric material 201 showing an electric voltage Vp that may be generated when the piezoelectric material is displaced. Piezoelectric materials may be of a crystal or ceramic structure and may be characterized as deforming slightly under the presence of an electric field. The reciprocal is also true in that when a piezoelectric material 201 is placed under deforming pressure, an electric voltage is generated. That is, the piezoelectric effect is a reversible process in that materials exhibiting the direct piezoelectric effect (the internal generation of electrical charge resulting from an applied mechanical force) also exhibit the reverse piezoelectric effect (the generation of a mechanical strain resulting from an applied electrical field).

Thus, in FIG. 2, when a force 205 is applied to the piezoelectric material 201, an electric voltage Vp between the top and bottom of the piezoelectric material (e.g., the poling direction 210) is generated. Piezoelectric material may be characterized as having crystal molecules that are dipoles—molecules that exhibit a pair of opposite charges disposed at opposite sides of a molecule. Thus, when a piezoelectric material undergoes poling, the individual dipole moments (wherein each dipole exhibits a dipole moment defined as a direction of an electric field that results from the separation of the positive and negative charge) become aligned. The direction of the alignment is called the poling direction. The voltage Vp is proportional to the amount of force 205 in a specific direction and may be used to detect the presence of a pressure at a specific location. Such detection techniques are discussed below with respect to FIGS. 3-5.

Potentially, piezoelectric materials may be manipulated to exhibit a piezoelectric characteristic through a process called poling. The process of poling involves aligning individual dipole moments (of the inherent crystal or ceramic molecules) in the material. When the piezoelectric material is subjected to a force, the voltage Vp is generated in the poling direction 210. Such piezoelectric materials may be measured in terms of a piezoelectric voltage constant g. The piezoelectric voltage constant g may be defined as the electric field generated by a piezoelectric material per unit of force applied. Further, the direction of the force in relation to the direction of the poling garners different constants. Thus, for a force $F_1$ 205 in the same direction as the poling direction $P_1$ 210, a first constant $g_{F1P1}$ governs the voltage generated. Similarly, for a force $F_2$ 206 in the orthogonal direction of the poling $P_1$ 210, a different constant $g_{F2P1}$ governs the voltage generated.

By way of non-limiting example, suppose the piezoelectric material is a polyvinylidene fluoride (PVDF) film, which may be well suited for this kind of use since it is almost completely transparent, yet is sufficiently rigid and durable for use as a see-through touch screen. PVDF film is available with the thickness as low as a few microns and may be manufactured to be a piezoelectric thin film transducer that is up to 98% transparent. Thus, a voltage Vp generated by the piezoelectric material when engaged with a vertical force $F_1$ may be defined by:

$$Vp = HF_1 g_{F1P1}$$

where H is the height (thickness) of the piezoelectric material 201 and may be for this example 9 um. A typical force $F_1$ applied may be done so using a stylus having a tip area of 1 $mm^2$ at a force of 1 Newton. F1 may be any location on the touch screen as the downward force from a pressure point from a stylus or finger will diminish accordingly as the measurement location gets further away from the source of the contact force (e.g., the stylus point of contact, for example). Further, the known piezoelectric constant $g_{F1P1}$ for PVDF film is:

$$g_{F1P1} = 0.330 \text{ V/m/N/m2}$$

Therefore, the voltage Vp, for this example, at the point of stylus contact is be calculated to be:

$$V_p = HF_1 g_{F1P1} = 2.97 \text{ V}$$

As the force of the pressure increases or decreases, the voltage Vp generated also proportionally increases or decreases.

Figure 3:
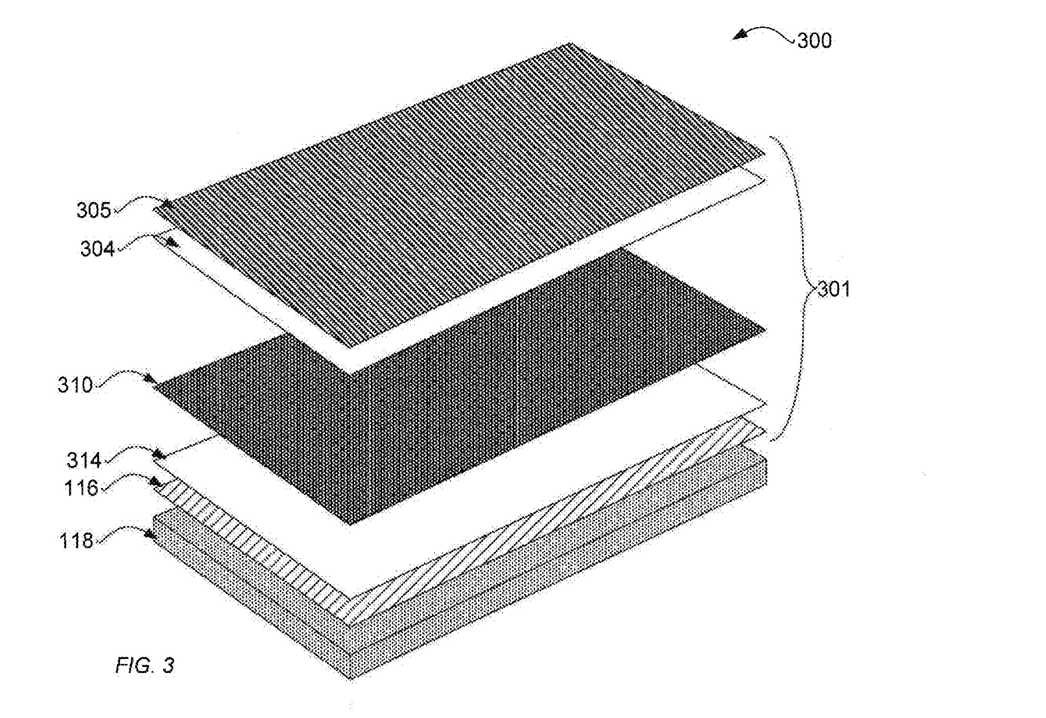
FIG. 3 is an exploded view of a touch screen device having a piezoelectric layer for sensing tactile input according to an embodiment of the subject matter disclosed herein.

Thus, the further away from the point of contact (stylus of finger point) of the force, the voltage Vp generated becomes smaller. As discussed in FIG. 3, measuring this voltage at various points in a piezoelectric layer (310 as shown in FIG. 3) allows a processor (shown in FIG. 6) to determine the point of contact and the amount of force applied at the point of contact. For the purposes of the discussion herein, two piezoelectric constants will be used for various calculation; a first piezoelectric constant $d_{31}$ corresponding to a voltage generated in a first direction (e.g., x-direction) when a vertical force F1 is applied and a second piezoelectric constant $d_{32}$ corresponding to a voltage generated in a transverse direction (e.g., y-direction) when the vertical force F1 is applied.

FIG. 3 is a diagram of a touch screen device 300 having a piezoelectric layer for sensing tactile input according to an embodiment of the subject matter disclosed herein. In this embodiment, a layer of piezoelectric material 310 may be disposed between first and second protective layers 314 and 304. Further, this combination of layers (1314-310-304) is flanked on the bottom side by a glass backer 116 and on the top side by a protective layer 302. Together, these layers form a touch screen 301 that overlays a display assembly 118 of the touch screen device 300.

When a user touches the touch screen 301 with a finger or a stylus, a force is created in a downward direction (e.g., toward the display assembly 118). Thus, a voltage is generated by the piezoelectric layer 310 localized around the point of pressure. This voltage diminishes as distance increases further away from the pressure point. A measure of voltage at specific locations allows a processor (not shown in FIG. 3) to calculate the position of the pressure point on the piezoelectric layer 310 as well as the relative force. As is discussed below, different embodiments and different methods may be used to determine the pressure point.

By using a piezoelectric layer 310 to sense tactile input, several advantages over conventional solutions may be realized. First, with a single piezoelectric layer 310 instead of two ITO layers (as is shown in FIG. 1), there are fewer layers and, therefore, fewer possibilities for failures to occur. Additionally, since the piezoelectric layer 310, by its nature, generates its own voltage, there may be no need for an external voltage supply to supply power to the touch screen. Further, the voltage generated by the piezoelectric layer 310 may be harvested (as is discussed further below with respect to FIG. 6) to provide additional supply power for other components in the touch screen device 300. Thus, the touch screen device 300 may realize a greater overall efficiency. Further yet, since the magnitude of voltage generated is proportional to the force of the pressure applied, the piezoelectric layer 310 may not only determine the location of the touch, but may also determine a relative pressure level of the touch. In contrast, a conventional touch screen may be incapable of determining the amount of force.

Figure 4A:
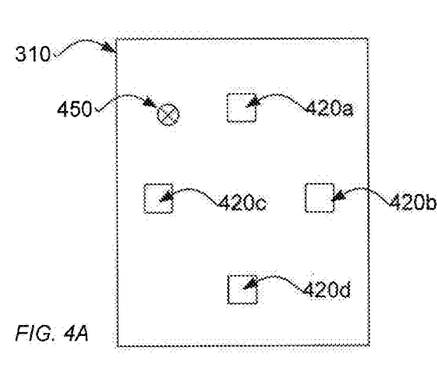
FIG. 4A is a top view of a piezoelectric layer of FIG. 3 having a pattern of indium-tin oxide (ITO) sensors suited to detect displacement of the piezoelectric layer 310 according to an embodiment of the subject matter disclosed herein.

FIG. 4 shows a top view of a piezoelectric layer of FIG. 3 having a pattern of indium-tin oxide (ITO) sensors 420a-d suited to detect displacement of the piezoelectric layer 310 according to an embodiment of the subject matter disclosed herein. In this embodiment, four ITO sensors 420a-d are placed in four locations on the piezoelectric layer 310. ITO sensors 420a-d, much like the ITO layers 114 and 104 of FIG. 1, are suited to be very thin (on the order of microns) and transparent to light. These locations may be a top-side ITO sensor 420a, a right-side ITO sensor 420b, a left-side ITO sensor 420c, and a bottom-side ITO sensor 420d. These positional names are arbitrary and merely used as a manner of identifying four different ITO sensors 420a-d located in a pattern suited to differentiate detected voltage as a result of pressure applied at a point on the piezoelectric layer 310.

When a force is applied at a point 450 on the piezoelectric layer 310, voltages are generated surrounding the point 450. The voltage will be strongest at the point 450. Because the piezoelectric layer 310 is an interconnected rigid thin film, additional voltages will still be generated surrounding the point 450, but with diminishing magnitude as the distance increases from the point 450. Thus, a measure of the voltage generated at the piezoelectric layer where each of the ITO sensor points 420a-d are located allows a processor (not shown in FIG. 4) to calculate the location of the point 450 based on the differential voltages detected at the sensor points 420a-d. This may be likened to triangulation when detecting wireless signals; however, the mathematical operation may include a calculation of an intersection of circles having a radius that is inversely proportional to the voltage detected at the piezoelectric layer 310 at each respective ITO sensor 420a-d location.

Thus, with a pressure at the point 450, a first voltage may be measured at the top-side ITO sensor 420a. A relatively similar voltage may also be measured at the left-side ITO sensor 420c because this sensor is almost equidistant from the top-side ITO sensor 420a. A smaller voltage may be measured at right-side ITO sensor 420b and the smallest voltage magnitude (as compared to ITO sensors 420a-c) may be detected at the bottom-side ITO sensor 420d. Knowing these four voltages detected at the four sensors 420a-d, one may be able to extrapolate the positions of the pressure point 450. Additionally, because the piezoelectric layer 310 generates larger voltages as the pressure increases at the point 450, one may also extrapolate a relative amount of force at the pressure point 450 by compensating for the piezoelectric constant that is known for the material. It is also noted that the pressure point 450 need not be within any boundary created by the ITO sensors 450a-d (e.g., between sensors or inside a diamond pattern in this embodiment). This mathematical concept is illustrated further with respect to FIG. 4B.

Figure 4B:
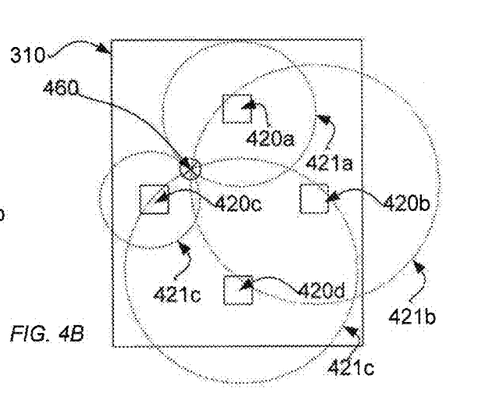
FIG. 4B is a top view of a piezoelectric layer of FIG. 3 having a pattern of indium-tin oxide (ITO) sensors that have detected displacement of the piezoelectric layer 310 and pinpointed the location according to an embodiment of the subject matter disclosed herein.

FIG. 4B is a top view of a piezoelectric layer of FIG. 3 having a pattern of indium-tin oxide (ITO) sensors 420a-d that have detected displacement of the piezoelectric layer 310 and pinpointed the location according to an embodiment of the subject matter disclosed herein. The displacement in this example is at point 460. Thus, at the first ITO sensor 420a, a voltage or charge is detected in the piezoelectric layer 310 that yields a first magnitude. With its close proximity to the point 460, one expects this voltage magnitude or charge magnitude to be larger than other more distant sensor locations. Thus, a proportional function may be used to indicate this detected voltage magnitude. In this example, the function is a circle 421b having a radius that is inversely proportional to the magnitude of the measured voltage wherein the circle is centered at the sensor 420a. In a similar manner, the other sensors 420b-d also measure a voltage or charge at each respective sensor location and generate a function proportional to the measured voltage (i.e., circles 421b-d. With these four functions describing measured voltage, one may calculate the intersection of the four functions to be the actual pressure point 460.

As can be appreciated in the art, the intersection of circles is but one functional relationship between sensor locations that may be used to calculate such a point 460 of magnitude. Thus, another functional relationship may be triangulation between any three sensors. As discussed above, a piezoelectric film may have three separate piezoelectric coefficients (e.g., $d_{31}$, $d_{32}$ and $d_{33}$, as discussed above) corresponding to an x-axis, a y-axis, and a z-axis. In applications where the piezoelectric layer is very thin (e.g., a touch screen), charge contributions from the z-axis may be ignored. By denoting the magnitude of voltages measured then in the main Cartesian coordinates x and y as $\sigma_x$, and $\sigma_y$, and the electrode area as $S_{el}$, the resultant output charge on each sensing element is calculated as:

$$Q = (d_{31}\sigma_x + d_{32}\sigma_y) S_{el}.$$

Figure 4C:
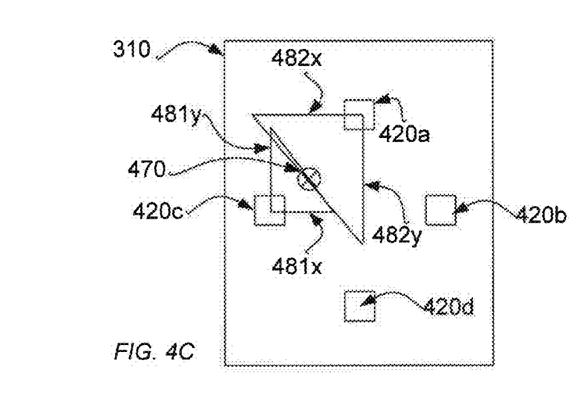
FIG. 4C is a top view of a piezoelectric layer of FIG. 3 having a pattern of indium-tin oxide (ITO) sensors that have detected displacement of the piezoelectric layer 310 and pinpointed the location according to another embodiment of the subject matter disclosed herein.

Such a triangulation method is further illustrated in FIG. 4C.

FIG. 4C is a top view of a piezoelectric layer of FIG. 3 having a pattern of indium-tin oxide (ITO) sensors that have detected displacement of the piezoelectric layer 310 and pinpointed the location according to another embodiment of the subject matter disclosed herein. Thus, as a pressure point 470 is generated, each sensor may detect a measurable voltage. Knowing the piezoelectric constant ($d_{31}$ and $d_{32}$) in the two coordinates (x and y direction), one can determine a vector for the third leg of a created triangle. That is, by calculating a first leg 481x and a second leg 481y, one can determine a third leg associated with sensor 420c that intersects the point 470. Similarly, one can calculate 482x and 482y to determine a third leg associated with sensor 420a that also intersects point 470. Then, these two calculated triangles may be used to calculation the intersection of the two triangles. Adding additional calculated triangles (e.g., from sensors 420b and 420d that are not shown) increases accuracy.

In other embodiments not shown, only three ITO sensors may be used to extrapolate positional information. Such an embodiment may not be as accurate or sensitive as a four sensor embodiment; however, the above-described method of extrapolating position and force of the point 450 still remain viable.

For example, maximum positioning error of a three ITO sensor embodiment when using a equilateral probe (i.e., a probe having a tip that is an equilateral triangle with equal length on each side) having a contact length of 7 mm is 2.23 mm. In yet other embodiments, there may be many more than four ITO sensors thereby greatly decreasing the maximum positioning error. Further, the locations of the ITO sensors may be of any pattern suited to extrapolate positional and pressure detection of the pressure point 450. One such pattern may be to have four ITO sensors located at the four corners of the piezoelectric layer 310. Other embodiments may include more than one piezoelectric layer 310 as discussed next with respect to FIG. 5.

With ITO sensors located in suitable positions, not only can point detections be determined (e.g., from a single point like a tip of a stylus), but also approximate shape of a probe that may be contacting the surface of a touch screen as several point detections are determined simultaneously. Thus, in an embodiment, a shaped probe (such as a human hand) may contact the touch screen in several places at once. By extrapolating all point sources at the same time, an approximate shape may be determined. Additional analysis of all detected voltage signals may result in a processor being able to assemble two-dimensional data as point sources within an x-y coordinate system. Thus, the shape of a tactile input may be determined.

Figure 5:
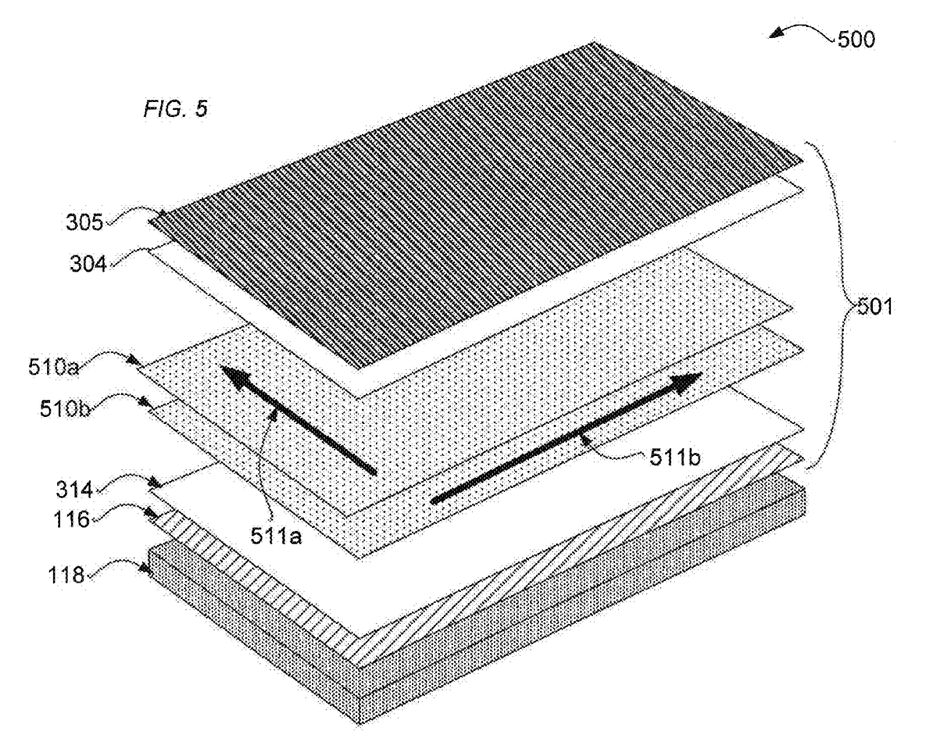
FIG. 5 is an exploded view of a touch screen device having two piezoelectric layers for sensing tactile input according to an embodiment of the subject matter disclosed herein.

FIG. 5 is an exploded view of a touch screen device 500 having two piezoelectric layers 510a and 510b for sensing tactile input according to an embodiment of the subject matter disclosed herein. In this embodiment, two distinct layers of piezoelectric material 510a and 510b may be disposed between first and second protective layers 314 and 304. Further, this combination of layers (314-510a/b-304) is flanked on the bottom side by a glass backer 116 and on the top side by a protective layer 302. Together, these layers form a touch screen 501 that overlays a display assembly 118 of the touch screen device 500.

When a user touches the touch screen 501 with a finger or a stylus, a force is created in a downward direction (e.g., toward the display assembly 118). However, with two different piezoelectric layers 510a an 510b, different poling directions may be utilized to further enhance the accuracy and sensitivity of the touch screen 501. By aligning the poling direction of the piezoelectric layer 510a in a first transverse direction 511a (e.g., orthogonal to the direction of downward pressure on the touch screen 501), a voltage is generated (as described above with respect to FIG. 2) by the piezoelectric layer 510a localized around the point of pressure. This voltage diminishes as distance increases further away from the pressure point. A measure of voltage at specific location will allow a processor (not shown in FIG. 5) to calculate the position of the pressure point on the piezoelectric layer 510a as well as the relative force. Simultaneously, the piezoelectric layer 510b may have a poling alignment in a second transverse direction 511b, thereby generating a voltage in the piezoelectric layer 510b localized around the same point of pressure. A measure of voltage at specific location will allow a processor to calculate the position of the pressure point on the piezoelectric layer 510b in a related but separate redundant manner. With redundant calculations generated from redundant detections on these two piezoelectric layers 510a and 510b, accuracy of the detection is increased. Further, the number of ITO sensors (not shown in FIG. 5) may be increased as better tactile detection resolution is desired. Further yet, the ITO sensors may also be disposed at the edges of the touch screen such that transparency is no longer an issue as well.

In another embodiment, only one layer 510a may be present with a poling direction in the first transverse direction 511a wherein only this layer 510a is used to detect tactile input. The second layer (e.g., second piezoelectric layer 510b) as described above may increase input resolution but may not be needed in some applications. Each of the above described embodiments may be used within a larger computing environment as described below with respect to FIG. 6.

Figure 6:
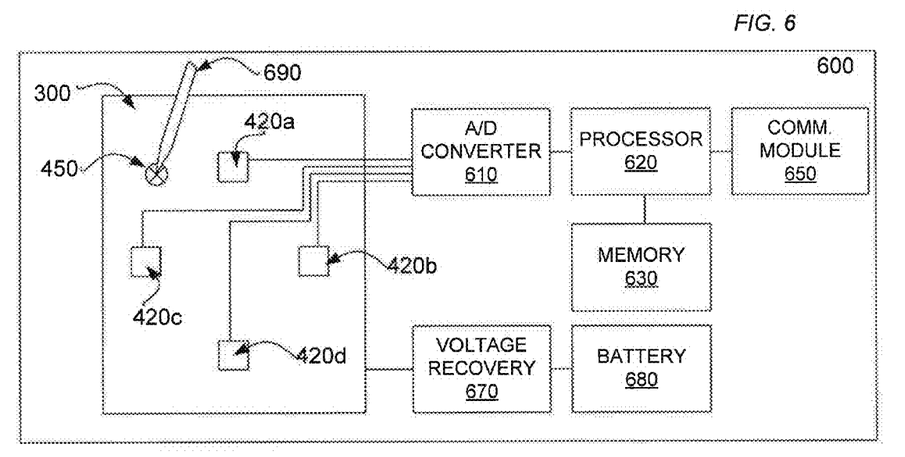
FIG. 6 is a diagram of a system having a touch screen device of FIGS. 2-5 according to an embodiment of the subject disclosed herein.

FIG. 6 is a diagram of a system 600 having a touch screen device 300 of FIGS. 2-5 according to an embodiment of the subject disclosed herein. In this system 600, a touch screen device 300 includes a piezoelectric layer (not shown in detail in the system 600 of FIG. 6) with four ITO sensors 420a-d for detecting tactile input as discussed above with respect to FIG. 4. Each of these ITO sensors 420a-d may be electrically coupled to an analog-to-digital converter 610 suited to receive an analog voltage signal and process the voltage signal (representative of tactile input at a pressure point 450 by a user's finger or a stylus 690) for use within a processor 620. Together, these sensors 420a-d and the ND converter 610 form a sensing circuit that may be configured to determine any tactile input on the piezoelectric layer. At the processor 620, the various voltage signals detected allow the processor 620 to calculate the location on the touch screen 300 of the pressure point 450 as well as a relative pressure of the touch according one or more of the methods discussed above.

In an embodiment, the processor 620 may keep a data log of the tactile input calculations in a local memory 630. Over time, intrinsic data about usage may be deduced and used to enhance the overall performance of the system. For example, if a user tends to use a specific level of pressure when using tactile input to manipulate the device, the processor algorithm for calculating the tactile input information may be adjusted to use or set maximum and minimum pressure levels for recognizing the input. Further, the collected intrinsic data may be communicated via a communications module 650 to a manufacturer to adjust newer models of the devices before they are manufactured as well as in the manufacture of devices suited for different but related applications.

In another embodiment, the electric charge generated from the piezoelectric material in the touch screen 300 may be harvested by a voltage-recovery circuit 670 to provide some compensating charge to a local battery 680.

Additional Embodiments with Interleaved Sensor Layer

Figure 7:
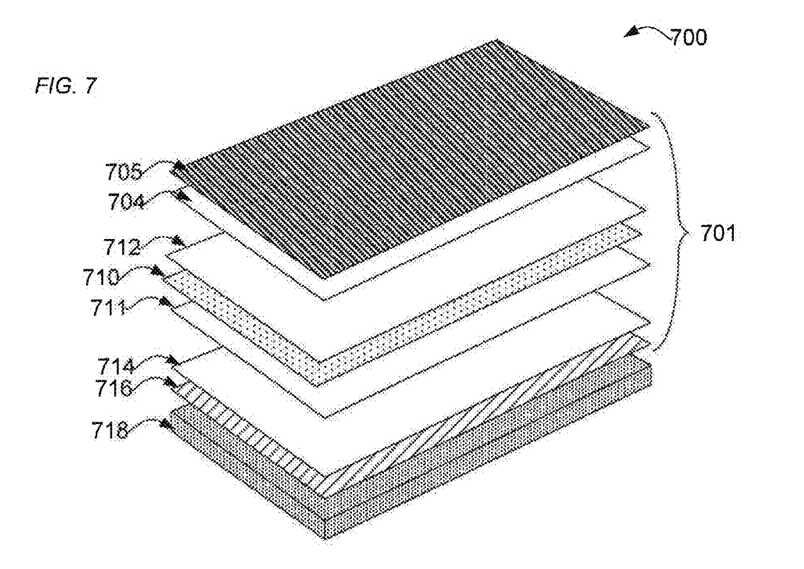
FIG. 7 is an exploded view of a touch screen device having a plurality of piezoelectric regions in a piezoelectric layer for sensing tactile input according to another embodiment of the subject matter disclosed herein.

FIG. 7 is an exploded view of a touch screen device 700 having a plurality of piezoelectric regions in a piezoelectric layer 710 for sensing tactile input according to another embodiment of the subject matter disclosed herein. In this embodiment, multiple concentrations of piezoelectric regions may be disposed in a layer of piezoelectric material 710 between first and second sensing layers 711 and 712. Further, this combination of layers (712-710-711), as before, may be flanked on the bottom side by a glass backer 716 and on the top side by a front panel layer 704 and a protective overlay 705. Together, all of these layers form a touch screen 701 that overlays a display assembly 718 of the touch screen device 700.

In this embodiment, the upper sensing layer 712 may be associated with several rows of sensing traces (not shown in detail in FIG. 7) that form a series of aligned electrical-signal sensors that may be utilized to determine an x-coordinate in the context of a common x-y axis. That is, if a voltage signal is sensed on a particular sensing trace in sensor layer 712, then one can deduce that this particular row corresponds to the x-coordinate of the tactile touch on the interface.

Similarly, the lower sensing layer 711 may be associated with several columns of aligned sensing traces (also not shown in detail in FIG. 7) that may be utilized to determine a y-coordinate. That is, if a voltage signal is sensed on a particular sensing trace in sensor layer 711, then one can deduce that this particular column corresponds to the x-coordinate of the tactile touch on the interface. Thus, the upper sensing layer 712 and the lower sensing layer 711 may form a mesh of sensing traces that form intersections of each row and column. Further, the piezoelectric layer 710 may be made of circular regions of piezoelectric material, each region centered at the intersection of each row and column in the respective upper sensing layer 712 and lower sensing layer 711. The aforementioned aspects of these layers are not shown in detail in FIG. 7 and are better understood with respect to FIG. 8 below.

Figure 8:
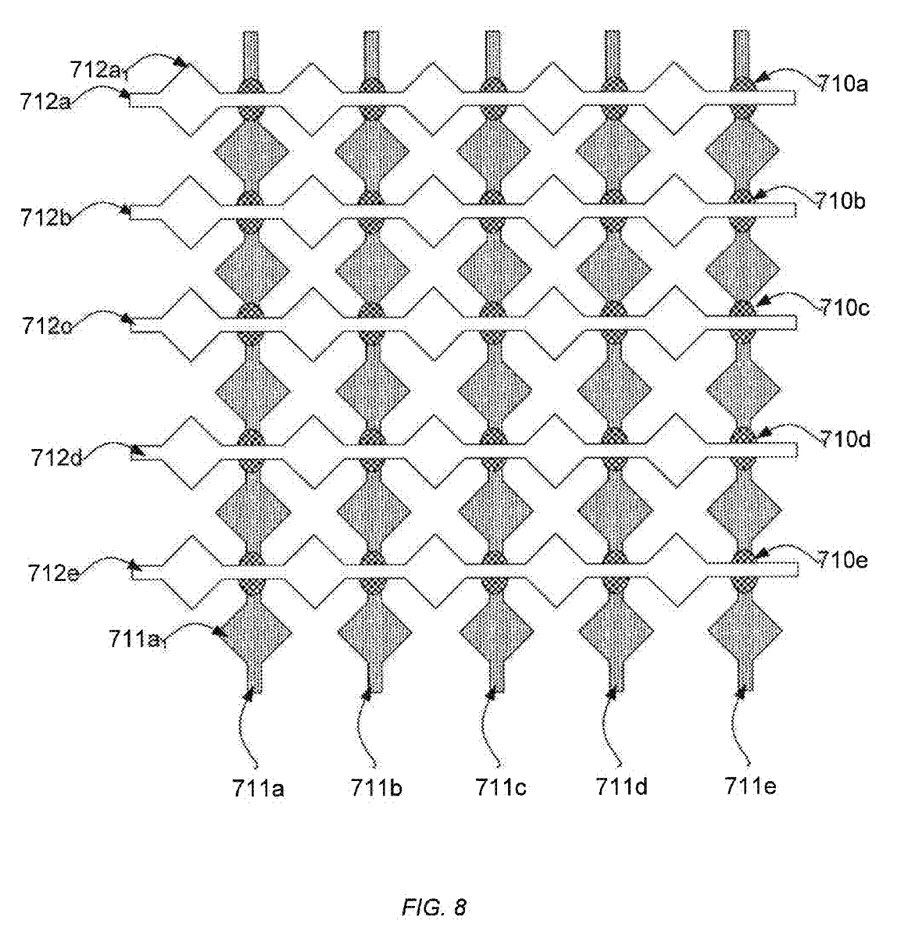
FIG. 8 is a plan view of two layers interposed of the touch screen device of FIG. 7 according to another embodiment of the subject matter disclosed herein.

FIG. 8 is a plan view of two layers interposed of the touch screen device of FIG. 7 according to another embodiment of the subject matter disclosed herein. Broadly, sensing layer 712 may actually be a plurality of aligned sensing traces arranged in parallel rows. As shown in the example of FIG. 8, there are five such rows 712a-712e. In embodiments, there may be any number of parallel rows of wire traces in signal layer 712, the bulk of which are not shown herein for simplicity. In a similar manner, sensing layer 711 may also actually be a plurality of aligned sensing traces arranged in parallel columns (the choice of rows and columns are for descriptive reasons alone as rows tend to be depicted as horizontal and columns tend to be depicted as vertical). As shown in the example of FIG. 8, there are five such columns 711a-711e as well. In embodiments, there may be any number of parallel columns of wire traces in signal layer 711, the bulk of which are not shown herein for simplicity. It is to be noted that each row 712a-712e are electrically isolated from each other and that each column 711a-711e are also electrically isolated from each other.

As can be seen, the rows 712a-712e and columns 711a-711e form a mesh whereby each row 712a-712e crosses each column 711a-711e at one respective intersection. At each respective intersection, a piezoelectric region from a piezoelectric layer is disposed between the respective row and respective column. Thus, as is shown, piezoelectric region 710a is disposed uniquely between row 712a and column 711e. In this continued example, piezoelectric regions 710b-710e are all disposed between column 711e and one of respective rows 712b-712e. In this manner, if one particular piezoelectric region generates a voltage signal as described in previous embodiments, it will necessarily generate a voltage signal on one corresponding row and one corresponding column. Continuing the example, if a tactile input causes piezoelectric region 710c to deform, a voltage is generated by the piezoelectric region that may be detected on both column 711e and row 712c. A coupled processor (FIG. 6) may then determine an x-y coordinate of the tactile input based on the detected row 712c and column 711e In this embodiment, FIG. 8 shows that the interleaved rows and columns are shown with diamond-body and neck pattern. Each row, such as row 712a exhibits a series of diamond-shaped bodies, such as body $712a_1$, that are coupled to each other by a narrow neck region. Similarly, each column, such as column 711a also exhibits a series of diamond-shaped bodies, such as body $711a_1$, that are coupled to each other by a narrow neck region. It is the neck region of each row and column where the intersections occur. Thus, a circular-shaped piezoelectric region is disposed at each intersection between the respective upper sensor layer 712 row and respective lower sensor layer 711 column. Such a diamond-shaped body pattern creates a substantially uniform covering for each sensor layer while still remaining electrically isolated at all intersections by a layer of piezoelectric regions 710.

Other body and neck patterns may also be used, such as oval-shaped, elliptical-shaped, circular-shaped bodies, rectangular-shaped bodies, etc., but are not shown in any FIG. for brevity. Other shapes for each piezoelectric regions is also contemplated, such as oval, elliptical, square, rectangular, or diamond as well.

With such an embodiment as shown in FIG. 7 and FIG. 8, an interface 700 may also be part of the system of FIG. 6 and configured to determine multiple tactile input locations at the same time. As each piezoelectric region may generate an independent voltage signal when deformed, more than one row or column may also, therefore, detect the multiple generated signals from the multiple deformed piezoelectric regions. Such a detection capability allows for common two-finger tactile input maneuvers such as zooming in or out. Other multiple tactile input location commands may be recognized as well, such as collapse a window or swipe to another application. Further yet, detecting multiple deformations along with relative pressure at the deformation (e.g., differing voltage levels generated by differing pressure levels), the interface may determine a shape of tactile input, such as a thumb press or a hand press. Further, because the piezoelectric regions do not rely upon the capacitive nature of human finger, the interface may function with a stylus or while wearing gloves.

In other embodiments, the resolution of the rows and columns may be reduced whereby a particular tactile input location may occur over an area that does not correspond uniquely to one and only one piezoelectric region. For example, a tactile input may occur close to a first row and a first column such that the intersection of the first row and first column has a piezoelectric region that is deformed by a specific amount and therefore generates a correlated voltage signal. At the same time, the same tactile input may be close enough to a second row such that the piezoelectric region at the intersection of the first column and the second row is also deformed causing an additional relatively sized voltage signal. The voltage signal may be proportionally less since the deformation may be less than the first piezoelectric region. Therefore, based on the proportion of the first row's voltage signal to the second row's voltage signal, a coupled processor may extrapolate a distance between the two deformed piezoelectric regions in which the tactile input originated. Extrapolation of multiple signals may be conducted at any scale whereby all voltage signals that are detected at any row or column are taken into account. Thus, specific locations may be able to be calculated based on relative signal strength near various intersections using fewer piezoelectric regions. This leads to being able to use fewer rows and columns since any location may be extrapolated from various signal inputs.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the disclosure.

What is claimed is:

1. An interface, comprising:
   a first signal layer having a plurality of rows of sensing regions aligned in a first direction;
   a second signal layer having a plurality of columns of sensing regions aligned in a second direction;
   a plurality of piezoelectric regions, each piezoelectric region being positioned at an intersection of a row and a column, at least one piezoelectric region generating a voltage when deformed by tactile input;
   a sensing circuit coupled the first and second signal layers configured to determine a tactile input from signals generated by at least one of the piezoelectric regions in the interface; and
   a voltage recovery circuit coupled to at least one of the piezoelectric regions configured to receive the voltage generated in the interface by the tactile input and charge a battery coupled to the voltage recovery circuit.

2. The interface of claim 1, wherein the first and second signal layers comprise indium-tin oxide layers.

3. The interface of claim 1, wherein the first and second signal layers comprise a diamond-shaped interleaving pattern.

4. The interface of claim 1, further comprising a first protective layer adjacent to a first surface of the piezoelectric layer.

5. The interface of claim 1, wherein the sensing circuit further comprises an analog-to-digital converter.

6. The interface of claim 1, wherein each piezoelectric region further comprises a transparent polyvinylidene fluoride film having a thickness of approximately nine micrometers.

7. The interface of claim 1, wherein each piezoelectric region is disposed in a plane between the first signal layer and the second signal layer and each piezoelectric region further comprises a direction of polarization that is orthogonal to the plane.

8. The interface of claim 1, wherein each piezoelectric region comprises a circular shape having an area that is at least as large as an area of intersection between one row of the first signal layer and one column of the second signal layer.

9. A computing device, comprising
   a processor;
   a display coupled to the processor and configured to display graphics under the control of the processor;
   a touch screen overlaying the display and coupled to the processor; the touch screen including:
      a first signal layer having a plurality of rows of sensing regions aligned in a first direction;
      a second signal layer having a plurality of columns of sensing regions aligned in a second direction;
      a plurality of piezoelectric regions, each piezoelectric region being positioned at an intersection of a row and a column, at least one piezoelectric region generating a voltage when deformed by tactile input; and
      a sensing circuit coupled the first and second signal layers configured to determine the tactile input from signals generated by at least one of the piezoelectric regions in the touch screen;
   a voltage recovery circuit coupled to at least one of the piezoelectric regions in the touch screen configured to receive the voltage generated in the touch screen; and
   a battery coupled to the voltage recovery circuit and configured to be charged by the voltage generated in the touch screen.

10. The device of claim 9, wherein the touch screen further comprises a first polyethylene terephthalate layer adjacent to a first surface of the piezoelectric layer; and
   a protective layer adjacent to the first polyethylene terephthalate layer; and
   a glass backer adjacent to a second surface of the piezoelectric layer.

11. The device of claim 9, wherein the processor is configured to determine multiple locations of tactile input.

12. The device of claim 9, wherein the processor is configured to determine a shape of the tactile input.

13. The device of claim 9, further comprising
   a memory coupled to the processor and configured to store data about the tactile input over time; and
   a communication module coupled to the processor and configured to communicate data stored in the memory to a remote computing device.

14. The device of claim 9 further comprising a stylus input device for generating tactile input.

15. The device of claim 9, wherein the processor is configured for keeping a data log of tactile input.

16. An interface, comprising:
   a piezoelectric layer configured to overlay a display, the piezoelectric layer having at least one piezoelectric region generating a voltage when deformed by tactile input;
   a plurality of sensors disposed in a pattern over the piezoelectric layer, the sensors configured to sense signals generated by the piezoelectric layer in the interface;

a sensing circuit coupled to the piezoelectric layer and configured to determine the tactile input from signals sensed by the sensors in the interface; and a voltage recovery circuit coupled to the piezoelectric layer configured to receive a voltage generated in the interface by tactile input to the at least one piezoelectric region and charge a battery coupled to the voltage recovery circuit.

17. The interface of claim 16, wherein the sensors further comprise indium-tin oxide sensors.

18. The interface of claim 17, wherein the pattern comprises four indium-tin oxide sensors arranged in a pattern suited to triangulate a tactile input from any location on the piezoelectric layer.

19. The interface of claim 16, wherein the piezoelectric layer further comprises a transparent polyvinylidene fluoride film having a thickness of approximately nine micrometers.

20. The interface of claim 16, wherein the piezoelectric layer further comprises a first direction of polarization, the interface further including a second piezoelectric layer adjacent to the piezoelectric layer having the first direction of polarization, the second piezoelectric layer having a direction of polarization that is orthogonal to the direction of polarization of the first piezoelectric layer.

* * * * *